3,455,942
2,6-BIS-(LOWER ALKANAMIDO)PYRIDINES
Ralph E. Tedeschi, Cherry Hill, N.J., and Joseph Weinstock, Phoenixville, Pa., assignors to Smith Kline & French Laboratories, Philadelphia, Pa., a corporation of Pennsylvania
No Drawing. Continuation-in-part of application Ser. No. 374,821, June 12, 1964. This application May 9, 1967, Ser. No. 637,069
Int. Cl. C07d 31/34, 31/42; A61k 27/00
U.S. Cl. 260—295    4 Claims

ABSTRACT OF THE DISCLOSURE 2,6-bis(lower alkanamido)pyridines having an optionally substituted phenoxy substituent in the 4-position and 2,6-bis(lower alkanamido)pyridine-N-oxides having an optionally substituted phenoxy or a lower alkoxy substituent in the 4-position are prepared by acylating a 2,6-diamino-4-phenoxy(or lower alkoxy)pyridine and, to prepare the N-oxides, oxidizing preferably with peracetic acid. The compounds have hypotensive activity.

---

This application is a continuation-in-part of application Ser. No. 374,821 filed June 12, 1964, now Patent No. 3,329,569.

This invention relates to new 2,6-bis(lower alkanamido) pyridines having pharmacodynamic activity, in particular having hyoptensive activity. For example, hypotensive activity is demonstrated on oral administration to neurogenic hypertensive dogs at doses of 5 to 40 mg./kg.

The 2,6-bis(lower alkanimido)pyridines of this invention are represented by the following formula:

Formula I

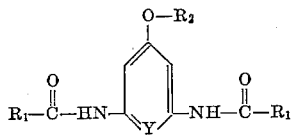

in which:
Y is N or N→O;
$R_1$ is lower alkyl and
$R_2$ is phenyl optionally substituted by 1 or 2 lower alkyl, lower alkoxy, halo or trifluoromethyl substituents or, when Y is N→O, lower alkyl having 3 to 8 carbon atoms.

The pharmaceutically acceptable acid addition salts of the compounds of Formula I are also included within the scope of this invention. Both organic and inorganic acids can be employed to form pharmaceutically acceptable salts, illustrative acids being sulfuric, nitric, phosphoric, citric, acetic, lactic, tartaric, ethanedisulfonic, sulfamic, succinic, fumaric, maleic, hydrochloric, hydrobromic, benzoic and the like. These salts are prepared by methods known to the art.

The 2,6-bis(lower alkanamido)pyridines of this invention are prepared by reacting a 2,6-diamino-4-phenoxy(or lower alkoxy)pyridine with an appropriate acylating agent such as a lower alkanoic acid anhydride or a lower alkanoic acid chloride. The reaction is conveniently carried out at room temperature.

The 2,6-bis(lower alkanamido)pyridine-N-oxides of this invention are prepared by oxidizing the 2,6-bis(lower alkanamido)pyridines preferably with peracetic acid. The reaction is carried out in an inert solvent for example chloroform, glacial acetic acid or a lower alkanol such as methanol and preferably at elevated temperature, conveniently at reflux temperature.

The 2,6-diamino-4-phenoxy(or lower alkoxy)pyridine starting materials are either known to the art or are prepared by the following procedures.

The 2,6-diamino-4-lower alkoxypyridine starting materials are prepared by erating chelidamic acid first with phosphorus pentachloride and then methanol to give 2,6-biscarbomethoxy-4-chloropyridine, reacting this 4-chloropyridine with an alkali metal lower alkoxide to give the 4-lower alkoxy compound, then reacting with hydrazine hydrate solution to give 2,6-bishydrazido-4-lower alkoxypyridine, rearranging the hydrazido groups under Curtius reaction conditions with aqueous sodium nitrite to give, upon hydrolysis of the intermediate acid azide with ethanol, the bisurethane which is hydrolyzed with alkali to give the 2,6-diamino-4-lower alkoxypyridine.

Alternatively, the 2,6-diamino-4-lower alkoxy(and preferably the 4-phenoxy)pyridine starting materials are prepared by treating 2,6-bis(carbomethoxy)-4-chloropyridine with ammonia to give 2,6-bis(carboxamido)-4-chloropyridine, reacting with an alkali metal lower alkoxide or phenoxide to give the 4-lower alkoxy(or phenoxy)-2,6-bis(carboxamido)pyridine and then treating with potassium hypobromite to give 2,6-diamino-4-lower alkoxy(or phenoxy)pyridine.

The novel compounds of this invention may be administered orally or parenterally in conventional dosage unit forms such as tablets, capsules, injectables or the like, by incorporating the appropriate does of a compound of Formula I or a pharmaceutically acceptable salt thereof with carriers according to accepted pharmaceutical practices.

The following examples are not limiting but are illustrative of the compounds of this invention and the methods of preparing them.

EXAMPLE 1

Acetic anhydride (75 ml.) is added to 11 g. of 2,6-diamino-4-phenoxypyridine and the solution allowed to stand at room temperature overnight. Excess anhydride is decomposed by the addition of 75 ml. of methanol and the mixture is evaporated in vacuo. The residue is triturated with water and then recrystallized from ethyl acetate-petroleum ether to give 2,6-disacetamido-4-phenoxypyridine, M.P. 174–177° C.

A solution of 1 g. 2,6-disacetamido-4-phenoxypyridine in ethyl acetate is treated with ethereal hydrogen chloride, then the salt which is 2,6-bisacetamido-4-phenoxypyridine hydrochloride is collected by filtration.

EXAMPLE 2

To a stirred solution of 14.5 g. of 2,6-bisacetamido-4-phenoxypyridine in 500 ml. of chloroform is added 28.5 g. of 40% peracetic acid and the mixture is refluxed for eight hours with stirring. The cooled reaction mixture is poured into about 400 ml. of ice-water, made basic to pH 9 with 40% sodium hydroxide solution and the chloroform layer is separated. The aqueous solution is extracted with chloroform and the combined extract is dried and evaporated. The residue is taken up in warm ethanol, the solution filtered, cooled and water added to precipitate 2,6-bisacetamido-4-phenoxypyridine-N-oxide, M.P. 205–210° C.

Five grams of 2,6-bisacetamido-4-phenoxypyridine-N-oxide is dissolved in ethyl acetate. One equivalent of sulfuric acid is added and the salt, which is 2,6-bisacetamido-4-phenoxypyridine-N-oxide sulfate is collected by filtration.

EXAMPLE 3

To 60 ml. of acetic anhydride is added 10 g. of 2,6-diamino - 4 - n - butoxypyridine and the mixture is allowed to stand overnight at room temperature. Methanol (60 ml.) is added to destroy excess anhydride and then the solvents are removed in vacuo. The residue is triturated with water to give after recrystallization 2,6-bisacetamido-4-n-butoxy-pyridine, M.P. 93–95° C.

To a stirred solution of 23.6 g. of the above butoxy-pyridine in 300 ml. of chloroform is added 45 g. of 40% peracetic acid and the mixture is refluxed for six hours. The reaction mixture is poured onto about 500 ml. of ice-water, made basic with 40% sodium hydroxide solution and the organic layer is separated. The basic layer is extracted with chloroform and the dried extract is evaporated. The residue is triturated with hexane and recrystallized to give 2,6-bis - acetamido - 4 - n - butoxy-pyridine-N-oxide, M.P. 145–146° C.

Similarly, using 2,6 - diamino - 4 - propoxypyridine, 2,6 - diamino - 4 - n - pentoxypyridine or 2,6 - diamino- 4 - n - hexyloxy - pyridine in the above procedure, the products are 2,6 - bis - acetamido - 4 - propoxypyridine-N - oxide, 2,6 - bisacetamido - 4 - n - pentoxypyridine-N - oxide and 2,6 - bisacetamido - 4 - n - hexyloxypyridine-N-oxide, respectively.

EXAMPLE 4

A mixture of 3.2 g. of sodium hydroxide and 25 ml. of o-cresol is heated in an oil bath at 140° C. with stirring until solution takes place. Dimethylformamide (100 ml.) is added and 15 ml. of solvent is distilled off. To the solution is added 12 g. of 2,6 - biscarboxamido-4 - chloropyridine and the mixture refluxed with stirring for five hours. The cooled reaction mixture is diluted with water and ether. The resulting precipitate is recrystallized to give 2,6-biscarboxamido - 4 - (2 - methylphenoxy)pyridine, M.P. 256–259° C.

To a stirred solution of 47.8 g. of potassium hydroxide in 300 ml. of water is added 8.7 ml. of bromine, dropwise, at 2° C. and then 16.8 g. of 2,6-biscarboxamido - 4 - (2 - methylphenoxy)pyridine. The mixture is stirred for 45 minutes at 0° C. and then heated rapidly at 75–80° C. for 15 minutes. The cooled reaction mixture is filtered and the filtrate treated with glacial acetic acid to pH 4.5. The precipitate is extracted with boiling water and the cooled extract is made basic with 40% sodium hydroxide solution. The resulting solid is recrystallized from toluene to give 2,6 - diamino - 4- (2-methylphenoxy)pyridine, M.P. 155–157° C.

By the procedure of Example 1, using 2,6 - diamino- 4 - (2 - methylphenoxy)pyridine, prepared as described above, in place of 2,6 - diamino - 4 - phenoxypyridine, 2,6 - bisacetamido - 4 - (2 - methylphenoxy)pyridine is prepared, M.P. 198–201° C.

Treating the above prepared bisacetamidopyridine with 40% peracetic acid by the procedure of Example 2 gives 2,6 - bisacetamido - 4 - (2 - methylphenoxy) pyridine-N-oxide, M.P. 223–224° C.

Similarly, using m-cresol or p-cresol in the above procedure, the products are, respectively, 2,6 - bisacetamido - 4 - (3 - methylphenoxy)pyridine and 2,6-bisacetamido - 4 - (4-methylphenoxy)pyridine and the corresponding N-oxides.

EXAMPLE 5

A mixture of 3.2 g. of sodium hydroxide and 35 ml. of o-chlorophenol is heated in an oil bath at 140° C. with stirring until solution is complete. Dimethylformamide (100 ml.) is added and then 20 ml. of solvent is distilled off to remove traces of water. To this is added 12 g. of 2,6 - biscarboxamido - 4 - chloropyridine and the mixture is refluxed with stirring for five hours. The reaction mixture is cooled, diluted with water and ether and filtered to give 2,6 - biscarboxamido - 4 - (2 - chlorophenoxy) pyridine.

To a stirred solution of 95.6 g. of potassium hydroxide in 600 ml. of water is added 17.4 ml. of bromine, dropwise, at 2° C. and then 36.2 g. of the above 2-chlorophenoxypridine. The reaction mixture is stirred for 45 minutes at 0° C. and then heated rapidly to 75–80° C. After 15 minutes at this temperature, the reaction mixture is cooled, filtered and the filtrate is treated with glacial acetic acid to pH 5. The gummy material is extracted with boiling water and the cooled aqueous mixture is made basic with 40% sodium hydroxide solution. The precipitate is sublimed in vacuo at 150° C. to give 2,6-diamino-4-(2-chlorophenoxy)pyridine.

A mixture of 12 g. of the above prepared pyridine and 75 ml. of acetic anhydride is allowed to stand at room temperature overnight. Methanol (75 ml.) is added and the mixture is evaporated in vacuo. The residue is triturated with water to give after recrystallization 2,6-bisacetamido-4-(2-chlorophenoxy)pyridine.

To a stirred solution of the above prepared bisacetamidopyridine in 500 ml. of chloroform is added 28 g. of 40% peracetic acid. The mixture is heated at reflux for eight hours, then poured onto about 500 ml. of ice-water. The mixture is made basic with 40% sodium hydroxide solution and worked up as in Example 2 to give 2,6 - bisacetamido - 4 - (2-chlorophenoxy)pyridine-N-oxide.

Similarly, using o-bromophenol in place of o-chlorophenol, there is obtained 2,6 - bisacetamido - 4 - (2-bromophenoxy) - pyridine and 2,6 - bisacetamido - 4- (2-bromophenoxy)pyridine-N-oxide.

EXAMPLE 6

A mixture of 3.2 g. of sodium hydroxide and 25 ml. of m-chlorophenol is heated in an oil bath at 140° C. with stirring until solution is complete. Dimethylformamide (150 ml.) is added and then 15 ml. of solvent is distilled off. To the solution is added 12 g. of 2,6-biscarboxamido - 4 - chloropyridine and the mixture is refluxed for five and one-half hours with stirring. The cooled reaction mixture is diluted with water and the resulting precipitate recrystallized from ethanol to give 2,6-biscarboxamido-4-(3-chlorophenoxy)pyridine.

To a stirred solution of 47.8 g. of potassium hydroxide in 285 ml. of water is added 8.7 ml. of bromine, dropwise, at 0° C. and then 18.1 g. of the above 3-chlorophenoxy pyridine. The mixture is stirred for 30 minutes at 0° C. and then heated rapidly to 75–80° C. for 15 minutes. The reaction mixture is cooled, filtered, acidified to pH 4 with glacial acetic acid and then made basic with 10% sodium hydroxide solution. The resulting solid is recrystallized from toluene to give 2,6-diamino-4-(3-chlorophenoxy)pyridine.

By the procedure of Example 1, the above prepared diaminopyridine is reacted with an excess of propionic anhydride to give 4 - (3-chlorophenoxy)-2,6-bispriopionamido-pyridine.

According to the procedure of Example 2, the above prepared bispropionamidopyridine in chloroform is refluxed with 40% peracetic acid to give 4-(3-chlorophenoxy)-2,6-bispropionamidopyridine-N-oxide.

By the same procedure, using o-fluorophenol in place of m-chlorophenol there is obtained 4-(2-fluorophenoxy)- 2,6-bispropionamidopyridine and the N-oxide thereof.

EXAMPLE 7

By the procedures of Examples 5 and 6, the sodium salt of p-chlorophenol and 12 g. of 2,6-biscarboxamido-4- chloropyridine are reacted to give 2,6-biscarboxamido-4- (4-chlorophenoxy)pyridine which is converted similarly with potassium hypobromite to yield the corresponding 2,6-diamino-4-(4-chlorophenoxy)pyridine.

Reacting the above prepared diaminopyridine with acetic anhydride by the procedure of Example 1 gives 2,6-bisacetamido-4-(4-chlorophenoxy)pyridine. Refluxing this pyridine in chloroform with 40% peracetic acid by the procedure of Example 2 gives 2,6-bisacetamido-4- (4-chlorophenoxy)pyridine-N-oxide.

By the same procedure using the sodium salt of 3,4-dichlorophenol, there is obtained 2,6-bisacetamido-4-(3,4-dichlorophenoxy)pyridine and the corresponding N-oxide.

EXAMPLE 8

Following the procedures of Examples 5 and 6, the sodium salt of 2,6-dimethylphenol and 2,6-biscarboxamido-4-chloropyridine are reacted to give 2,6-biscarboxamido-4-(2,6-dimethylphenoxy)pyridine which is similarly treated with potassium hypobromite to yield 2,6-diamino-4-(2,6-dimethylphenoxy)pyridine.

Reacting the above prepared diaminopyridine with acetic anhydride according to the procedure of Example 1 gives 2,6-bisacetamido-4-(2,6-dimethylphenoxy)pyridine which is refluxed in chloroform with 40% peracetic acid to give 2,6-bisacetamido-4-(2,6-dimethylphenoxy)pyridine-N-oxide.

Similarly, using 2-ethylphenol and 2,6-biscarboxamido-4-chloropyridine, the products are 2,6-bisacetamido-4-(2-ethylphenoxy)pyridine and the N-oxide thereof.

EXAMPLE 9

A mixture of 3.2 g. of sodium hydroxide and 25 ml. of o-methoxyphenol is heated in an oil bath at 140° C. with stirring until solution is complete and then 100 ml. of dimethylformamide is added. Fifteen milliliters of solvent is distilled off and 12 g. of 2,6-biscarboxamido-4-chloropyridine is added. The mixture is refluxed for five hours with stirring, then cooled and diluted with water. The precipitate is recrystallized to give 2,6-biscarboxamido-4-(2-methoxyphenoxy)pyridine.

To a stirred solution of 47.8 g. of potassium hydroxide in 300 ml. of water is added 8.7 ml. of bromine, dropwise, at 0–2° C. and then 17.8 g. of the above 2-methoxyphenoxy pyridine. The mixture is stirred for 45 minutes at 0° C., 300 ml. of water is added and the mixture subsequently heated rapidly to 75–80° C. for 15 minutes. The cooled reaction mixture is filtered and treated with glacial acetic acid to pH 4. The precipitate is filtered off, the filtrate made basic with 40% sodium hydroxide solution and then extracted with ethyl acetate. The precipitate is extracted with boiling water, the extract cooled, similarly made basic and extracted with ethyl acetate. The combined ethyl acetate extracts are dried and evaporated to give a residue which is suspended in ethyl acetate and precipitated with hexane to give 2,6-diamino-4-(2-methoxyphenoxy)pyridine.

By the procedure of Example 1, the above prepared diaminopyridine is reacted with acetic anhydride to give 2,6-bisacetamido-4-(2-methoxyphenoxy)pyridine which is treated with 40% peracetic acid by the procedure of Example 2 to give 2,6-bisacetamido-4-(2-methoxyphenoxy)pyridine-N-oxide.

Similarly, using m-methoxyphenol or p-methoxyphenol the products are 2,6-bisacetamido-4-(3-methoxyphenoxy)pyridine and the corresponding N-oxide and 2,6-bisacetamido-4-(4-methoxyphenoxy)pyridine and the corresponding N-oxide, respectively.

EXAMPLE 10

Following the procedures of Examples 5 and 6, the sodium salt of 2,6-dimethoxyphenol and 2,6-biscarboxamido-4-chloropyridine are reacted to give 2,6-biscarboxamido-4-(2,6-dimethoxyphenoxy)pyridine which is treated with potassium hypobromite to yield 2,6-diamino-4-(2,6-dimethoxyphenoxy)pyridine.

Reacting the above prepared diaminopyridine with acetic anhydride by the procedure of Example 1, gives 2,6 - bisacetamido - 4 - (2,6 - dimethoxyphenoxy)pyridine which is treated with 40% peracetic acid by the procedure of Example 2 to give 2,6-bisacetamido-4-(2,6-dimethoxyphenoxy)pyridine-N-oxide.

Similarly, using the sodium salt of 4-propoxyphenol in the above procedure, 2,6-bisacetamido-4-(4-propoxyphenoxy)pyridine and the corresponding N-oxide are prepared.

EXAMPLE 11

3-trifluoromethylphenol is converted to its sodium salt and reacted with 2,6-biscarboxamido-4-chloropyridine to give 2,6-biscarboxamido-4-(3-trifluoromethylphenoxy)pyridine which is treated with potassium hypobromite to give 2,6-diamino-4-(3-trifluoromethylphenoxy)pyridine.

Acetic anhydride (65 ml.) is added to 10 g. of 2,6-diamino-4-(3-trifluoromethylphenoxy)pyridine. The resulting mixture is allowed to stand at room temperature overnight. Methanol (65 ml.) is added and the mixture is evaporated in vacuo. The residue is triturated with water and recrystallized to give 2,6-bisacetamido-4-(3-trifluoromethylphenoxy)pyridine.

The above prepared pyridine in chloroform is refluxed with 40% peracetic acid for eight hours to give, after working up as in Example 2, 2,6-bisacetamido-4-(3-trifluoromethyl-phenoxy)pyridine-N-oxide.

EXAMPLE 12

To a stirred solution of 16.1 g. of sodium in 300 ml. of 2-methylbutanol-1 is added 99.8 g. of 2,6-biscarboxamido-4-chloropyridine and 800 ml. of dimethylformamide. The mixture is refluxed for five and one-half hours with stirring, cooled and diluted with water. The precipitate is recrystallized to give 2,6-biscarboxamido-4-(2-methylbutoxy)pyridine.

To a stirred solution of 47.8 g. of potassium hydroxide in 300 ml. of water is added 8.7 ml. of bromine, dropwise, at 2° C. and then 15.6 g. of the above biscarboxamide. The mixture is stirred one and one-half hours at 0° C., filtered and the filtrate heated to 50° C. for five minutes. The cooled reaction mixture is treated with glacial acetic acid to pH 5 and then made basic with 40% sodium hydroxide solution. The precipitate is purified by sublimation to give 2,6-diamino-4-(2-methylbutoxy)pyridine.

Following the procedures of Examples 1 and 2, the above prepared diaminopyridine is converted to 2,6-bisacetamido-4-(2-methylbutoxy)pyridine-N-oxide.

Similarly, by employing 3-methyl-butanol-1 in the above reaction sequence, there is obtained 2,6-bisacetamdo-4-(3-methylbutoxy)pyridine-N-oxide.

EXAMPLE 13

Propionic anhydride (50 ml.) is added to 6 g. of 2,6-diamino-4-phenoxypyridine. The resulting solution is allowed to stand at room temperature for 16 hours. Methanol (50 ml.) is added and the mixture is evaporated in vacuo. The residue is triturated with water and recrystallized to give 4-phenoxy-2,6-bispropionamidopyridine.

To a stirred solution of 2.5 g. of the above prepared pyridine in 50 ml. of chloroform is added 4.5 g. of 40% peracetic acid. The mixture is refluxed for six hours, then poured onto 100 ml. of ice-water and worked up as in Example 2 to give 4-phenoxy-2,6-bispropionamidopyridine-N-oxide.

EXAMPLE 14

By the procedure of Example 13 using butyric anhydride or valeric anhydride, there is obtained 2,6-bisbutyramido-4-phenoxypyridine and the corresponding N-oxide and 4-phenoxy-2,6-bisvaleramidopyridine and the corresponding N-oxide, respectively.

Similarly, by the procedure of Example 13 using propionic anhydride and 2,6-diamino-4-n-butoxypyridine there is obtained 4-n-butoxy - 2,6 - bispropionamidopyridine-N-oxide.

What is claimed is:
1. A chemical compound of the formula:

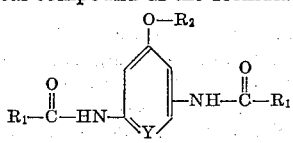

in which:

Y is N or N→O;
R₁ is lower alkyl and
R₂ is phenyl optionally substituted by 1 or 2 lower alkyl, lower alkoxy, halo or trifluoromethyl substituents or, when Y is N→O, lower alkyl having 3 to 8 carbon atoms and pharmaceutically acceptable salts thereof.

2. A compound according to claim 1 in which Y is N, R₁ is methyl and R₂ is phenyl, said compound being 2,6-bisacetamido-4-phenoxypyridine.

3. A compound according to claim 1 in which Y is N→O, R₁ is methyl and R₂ is phenyl, said compound ring 2,6-bisacetamido-4-phenoxypyridine-N-oxide.

4. A compound according to claim 1 in which Y is N→O, R₁ is methyl and R₂ is n-butyl, said compound being 2,6-bisacetamido-4-n-butoxypyridine-N-oxide.

References Cited

Markees et al., Archives of Biochemistry and Biophysics, vol. 86, pp. 179–184, (1960).

HENRY R. JILES, Primary Examiner

A. L. ROTMAN, Assistant Examiner

U.S. Cl. X.R.

260—296; 424—266